(12) United States Patent
Choudhary et al.

(10) Patent No.: US 7,432,222 B2
(45) Date of Patent: Oct. 7, 2008

(54) HIGH TEMPERATURE STABLE NON-NOBLE METAL CATALYST, PROCESS FOR PRODUCTION OF SYNGAS USING SAID CATALYST

(75) Inventors: Vasant Ramchandra Choudhary, Maharashtra (IN); Kartick Chandra Mondal, Maharashtra (IN); Ajit Singh Mamman, Maharashtra (IN)

(73) Assignee: Council of Scientific and Industrial Research, Rafi Marg, New Delhi (IN)

( * ) Notice: Subject to any disclaimer, the term of this patent is extended or adjusted under 35 U.S.C. 154(b) by 443 days.

(21) Appl. No.: 10/978,791

(22) Filed: Nov. 1, 2004

(65) Prior Publication Data

US 2006/0093550 A1 May 4, 2006

(51) Int. Cl.
*B01J 23/00* (2006.01)
*C01B 3/26* (2006.01)
*C01B 3/28* (2006.01)

(52) U.S. Cl. .................. 502/304; 423/651; 252/373

(58) Field of Classification Search ......... 423/650–654; 502/300, 302, 304, 355; 48/197 R, 198.1, 48/198.5; 252/373
See application file for complete search history.

(56) References Cited

U.S. PATENT DOCUMENTS

| | | | |
|---|---|---|---|
| 4,415,484 A | | 11/1983 | Setzer et al. |
| 4,473,543 A | | 9/1984 | Setzer et al. |
| 4,503,029 A | | 3/1985 | Setzer et al. |
| 4,552,852 A | * | 11/1985 | Manning ............... 501/105 |
| 4,755,498 A | | 7/1988 | Setzer et al. |
| 5,368,835 A | * | 11/1994 | Choudhary et al. ...... 423/651 |
| 5,714,091 A | * | 2/1998 | Mazanec et al. ......... 252/373 |
| 5,744,419 A | * | 4/1998 | Choudhary et al. ...... 502/326 |
| 6,087,545 A | * | 7/2000 | Choudhary et al. ...... 585/658 |
| 6,255,358 B1 | * | 7/2001 | Singleton et al. ....... 518/715 |
| 6,293,979 B1 | * | 9/2001 | Choudhary et al. ...... 48/198.7 |
| 6,576,589 B1 | * | 6/2003 | Han et al. ............. 502/350 |
| 6,887,456 B2 | * | 5/2005 | Xu et al. .............. 423/651 |
| 2003/0096880 A1 | * | 5/2003 | Wang et al. ............ 518/714 |

OTHER PUBLICATIONS

Miao et al., "Partial oxidation of mthane to syngas over nickel-based catalysts modified by alkali metal oxide and rare earth metal oxide", Applied Catalysis A: General 154 (1997) 17-27.*
Otsuka et al., "Partial Oxidation of Methane Using the Redox of Cerium Oxide", Chemistry Letters, 1993, pp. 1517-1520.*
Otsuka et al., "Direct Partial Oxidation of Methane to Synthesis Gas by Cerium Oxide", Journal of Catalysis 175, 152-160 (1998).*
Choudhary et al., "Influence of Support on Surface Basicity and Catalytic Activity in Oxidative Coupling of Methane of Li-MgO Deposited on Different Commercial Catalyst Carriers", Journal of Chemical Technology and Biotechnology, 1998, 72, 99-104.*
V. R. Choudhary, B. S. Uphade, and A. S. Mamman, Oxidative Conversion of Methane to Syngas over Nickel Supported on Commercial Low Surface Area Porous Catalyst Carriers Precoated with Alkaline and Rare Earth Oxides, *Journal of Catalysis* 1997, 281-293, 172.

* cited by examiner

*Primary Examiner*—Steven Bos
*Assistant Examiner*—Anthony J Zimmer
(74) *Attorney, Agent, or Firm*—Morgan & Finnegan, LLP

(57) ABSTRACT

This invention discloses a high temperature stable, supported, non-noble metal catalyst, represented by a general formula: $NiCo_aCe_bMg_cY_dO_x(y)/S$, wherein S is a low surface area, macroporous, highly sintered, solid support comprising zirconium and hafnium oxides with less than 3 wt % silica and/or alumina having a surface area less than 1.0 m²/g and pore diameter greater than 0.1 micron, in the form of pellet, ring, monolith or granules; a is from 0.01 to 10; b is from 0.001 to 10; c is from 0.001 to 10; d is from 0.005 to 5; x is number of oxygen atoms required to fulfill the valance requirement of the metallic elements; and y is weight percent loading of the active catalyst mass, on the support, S, in the range from 0.7% to 70%. The invention also discloses a process for the partial oxidation of hydrocarbon(s) to syngas using the thermally stable catalyst.

35 Claims, No Drawings

US 7,432,222 B2

HIGH TEMPERATURE STABLE NON-NOBLE METAL CATALYST, PROCESS FOR PRODUCTION OF SYNGAS USING SAID CATALYST

FIELD OF THE INVENTION

The present invention relates to a high temperature stable non-noble metal catalyst useful for the autothermal reforming or catalytic partial oxidation of hydrocarbon(s) to syngas. The present invention also relates to a process for syngas production from hydrocarbon(s) using the said catalyst. The present invention particularly relates to a high temperature stable non-noble metal catalyst, useful for the autothermal reforming or catalytic partial oxidation of hydrocarbon(s) to syngas, which shows the catalytic activity when calcined at or above 1400° C. or even when directly subjected to an acetylene-oxygen flame. The present invention also relates to a process for syngas production by partial oxidation of hydrocarbon(s) by oxygen in the presence or absence of steam and/or carbon dioxide in feed.

The high temperature stable non-noble metal catalyst of this invention can be used in chemical industries for the autothermal reforming of hydrocarbon(s) to syngas and also for the partial oxidation of hydrocarbon(s) to syngas. The process of this invention can be used in chemical industries for the production of syngas, a mixture of carbon monoxide and hydrogen, which is a feedstock for the methanol and Fischer-Trospch synthesis process and also for hydrogen production.

BACKGROUND OF THE INVENTION

Syngas, a mixture of carbon monoxide and hydrogen is a versatile feedstock for the methanol, ammonia and Fischer-Trospch synthesis processes and also for production of hydrogen. It is conventionally produced by various forms of steam reforming e.g. methane steam reforming (MSR). Although technologically very well established and practiced commercially since a long, the steam reforming is highly endothermic and hence highly energy intensive process and also has high capital and process operating costs. Under the present energy crisis, there is a need to replace the steam reforming by a more economical process, particularly requiring a little or no external energy.

Process for the reforming of hydrocarbons to syngas, such as autothermal reforming (ATR) and catalytic partial oxidation (CPO) of hydrocarbon(s), involving exothermic hydrocarbon conversion reactions and hence requiring little or no external energy, are also known in the prior art.

In the ATR process, the conversion of hydrocarbon(s) to syngas is accomplished in two steps as follows: In the first step, only part of hydrocarbon is combusted by oxygen in flame, producing a hot stream comprising uncombusted hydrocarbon(s), steam and carbon oxides; the temperature of this stream is above about 1300° C. In the second step, the hot stream is contacted with a steam reforming catalyst to convert the uncombusted hydrocarbon(s) to syngas by the steam and $CO_2$ reforming reactions. In this process, the catalyst subjected to a very high temperature, above about 1300° C. and hence it is deactivated due to sintering at the high temperature. Moreover, the catalyst is also subjected to high temperature shocks during the start up and closing down operations in the autothermal reforming leading to catalyst fouling, which results from both the disintrigration and sintering of the catalyst. Even in the case of a CPO process, the temperature at the catalyst surface may rise upto about 1300° C. due to the highly exothermic hydrocarbon combustion reactions, causing heavy sintering, and consequently deactivation of the catalyst. Hence, the catalyst used in both the processes should have high temperature stability; it should be catalytically active when calcined at a temperature of 1300° C.-1400° C. and also when subjected to high temperature shocks.

A few noble metal or nickel containing catalysts have been claimed in the prior art for their use in the ATR process.

In U.S. Pat. Nos. 4,415,484 and 4,473,543, Setzer et al disclose a Rh deposited on a calcium oxide impregnated alumina, as highly active steam reforming catalyst for use in ATR processes. A rhodium, iridium, palladium, platinum or nickel supported on lanthanum stabilized alumina or magnesium promoted lanthanum stabilized alumina has also been disclosed as highly active, sulphur tolerant steam reforming catalyst useful for the ATR in U.S. Pat. Nos. 4,503,029 and 4,755,498 by Setzer, et. al. However, the use of noble metal containing catalysts in the ATR process is limited because of the high cost of the noble metals used in the catalysts and also because of heavy sintering of the noble metals, leading to catalyst deactivation under the high temperature conditions prevailing in the ATR. The use of nickel containing catalyst in the ATR is also limited because of the solid-solid reaction between the compounds of nickel and alumina leading to formation of catalytically inactive binary metal oxides e.g. nickel aluminates, along with the catalyst sintering under the prevailing high temperature conditions in the ATR (Choudhary et. al. Journal of Catalysis, vol. 172, pages 281-293, year 1997).

Choudhary et al disclose a highly active catalyst, nickel supported on commercial low surface area porous silica-alumina catalyst carrier precoated with magnesia, for oxidative conversion of methane by oxygen to syngas. However, when this catalyst was calcined at 1200° C., it was found to be completely deactivated for the oxidative conversion of methane due to formation of catalytically inactive nickel aluminates by a solid-solid reaction between nickel and alumina from the support and also due to sintering of nickel at the high calcination temperature. The catalyst was however highly active upto its calcination temperature of 1050° C. (Choudhary et al, Journal of Catalysis, vol. 172, pages 281-293, 1997). Hence, use of this catalyst for the ATR or adiabatic CPO processes is limited because of its low temperature stability or deactivation under high temperature operation.

The ATR and CPO processes would become commercially feasible and also attractive provided a robust high temperature stable catalyst, which contains non-noble metal(s) as an active catalyst component(s) and which shows high activity for hydrocarbon(s)-to-syngas conversion when heated to a high temperature, about 1400° C., and also when subjected to high temperature shocks, without its disintrigration, is developed.

OBJECTS OF THE INVENTION

The main object of this invention is to provide a highly active, high temperature stable supported non-noble metal catalyst useful for the ATR and CPO processes.

Another object of this invention is to provide a high temperature stable supported non-noble metal catalyst, which when heated at a high temperature about 1400° C. shows high activity for hydrocarbon-to-syngas conversion reactions, such as partial oxidation of methane, steam reforming and simultaneous partial oxidation and steam/carbon dioxide reforming of methane.

Yet another object of this invention is to provide a high temperature stable supported non-noble metal catalyst, which even when subjected to a number of very high temperature shocks by its direct exposure to a flame is not disintrigrated into smaller particles and also shows high catalytic activity and selectivity for the methane-to-syngas conversion reactions.

SUMMARY OF THE INVENTION

This invention provides a high temperature stable supported non-noble metal catalyst of the formula:

$$NiCo_aCe_bMg_cY_dO_x(y)/S$$

wherein S is a low surface area macroporous highly sintered solid support essentially comprising of zirconium and hafnium oxides with less than 3 wt % silica and/or alumina and with a surface area of less than 1.0 m²/g and pore diameter greater than 0.1 micron, in a form of pellet, ring, monolith or granules; Ni, Co, Ce, Mg, Y and O are nickel, cobalt, cerium, magnesium, yttrium and oxygen respectively; a is Co/Ni mole ratio; b is Ce/Ni mole ratio; c is Mg/Ni mole ratio; d is Y/Ni mole ratio; x is number of oxygen atoms required to fulfil the valance requirement of the metallic elements, $NiCo_aCe_bMg_cY_d$; and y is weight percent loading of the active catalyst mass, $NiCo_aCe_bMg_cY_dO_x$, on the support, S.

In one embodiment of the invention, a is in the range of from 0.01 to 10.

In another embodiment of the invention, b is in the range of from 0.001 to 10.

In another embodiment of the invention, c is in the range of from 0.001 to 10.

In another embodiment of the invention, d is in the range from 0.005 to 5.

In another embodiment of the invention, y is in the range from 0.7% to 70%.

In a further embodiment of the invention, a is between 0.1 and 1.0.

In a further embodiment of the invention, b is between 0.01 and 2.0.

In a further embodiment of the invention, c is between 0.01 and 2.0.

In a further embodiment of the invention, d is between 0.02 and 0.5.

In a further embodiment of the invention, y is between 5% and 50%.

The present invention also provides a process for the preparation of a high temperature stable supported non-noble metal catalyst of the formula:

$$NiCo_aCe_bMg_cY_dO_x(y)/S$$

wherein S is a low surface area macroporous highly sintered solid support essentially comprising of zirconium and hafnium oxides with less than 3 wt % silica and/or alumina and with a surface area of less than 1.0 m²/g and pore diameter greater than 0.1 micron, in a form of pellet, ring, monolith or granules; Ni, Co, Ce, Mg, Y and O are nickel, cobalt, cerium, magnesium, yttrium and oxygen respectively; a is Co/Ni mole ratio; b is Ce/Ni mole ratio; c is Mg/Ni mole ratio; d is Y/Ni mole ratio; x is number of oxygen atoms required to fulfil the valance requirement of the metallic elements, $NiCo_aCe_bMg_cY_d$; and y is weight percent loading of the active catalyst mass, $NiCo_aCe_bMg_cY_dO_x$, on the support, S, the process comprising:

(a) depositing a mixture of compounds of nickel, cobalt, cerium, magnesium and yttrium, which on thermal decomposition are convertible into their respective metal oxides, by impregnation or co-precipitation on the support, (b) decomposing the metal compounds deposited on the support at an effective temperature, and (c) calcining the decomposed catalyst mass at a temperature above 1200° C.

In one embodiment of the invention, the deposition in step (a) above is carried out while ensuring that the Co/Ni, Ce/Ni, Mg/Ni and Y/Ni mole ratios and the weight percentages loading of the metal oxides on the support are as follows:

a is in the range of from 0.01 to 10;
b is in the range of from 0.001 to 10;
c is in the range of from 0.001 to 10;
d is in the range from 0.005 to 5; and
y is in the range from 0.7% to 70%.

In a further embodiment of the invention, a is between 0.1 and 1.0.

In a further embodiment of the invention, b is between 0.01 and 2.0.

In a further embodiment of the invention, c is between 0.01 and 2.0.

In a further embodiment of the invention, d is between 0.02 and 0.5.

In a further embodiment of the invention, y is between 5% and 50%.

In another embodiment of the invention, the calcination in step (c) is carried out at a temperature of about 1400° C.

The present invention also provides a process for the partial oxidation of hydrocarbon(s) to a mixture of carbon monoxide and hydrogen by oxygen in the presence or absence of steam and/or carbon dioxide in the feed, using a high temperature stable supported non-noble metal catalyst, represented by the formula:

$$NiCo_aCe_bMg_cY_dO_x(y)/S$$

wherein S is a low surface area macroporous highly sintered solid support essentially comprising of zirconium and hafnium oxides with less than 3 wt % silica and/or alumina and with a surface area of less than 1.0 m²/g and pore diameter greater than 0.1 micron, in a form of pellet, ring, monolith or granules; Ni, Co, Ce, Mg, Y and O are nickel, cobalt, cerium, magnesium, yttrium and oxygen respectively; a is Co/Ni mole ratio; b is Ce/Ni mole ratio; c is Mg/Ni mole ratio; d is Y/Ni mole ratio; x is number of oxygen atoms required to fulfil the valance requirement of the metallic elements, $NiCo_aCe_bMg_cY_d$; and y is weight percent loading of the active catalyst mass, $NiCo_aCe_bMg_cY_dO_x$, on the support, S, the process comprising:

(i) pre-treating the catalyst with hydrogen at a temperature above 800° C.; and (ii) contacting a gaseous feed comprising hydrocarbon(s) and oxygen with the catalyst in a continuous gas-solid catalyst contactor.

In one embodiment of the invention, the pre-treatment of the catalyst is carried out in the presence of an inert gas.

In another embodiment of the invention, the pre-treatment of the catalyst is carried out in the absence of an inert gas.

In another embodiment of the invention, the hydrocarbon is contacted with the catalyst in the absence of steam and/or carbon dioxide.

In another embodiment of the invention, the hydrocarbon feed is contacted with the catalyst in the presence of steam and/or carbon dioxide.

In another embodiment of the invention, the oxygen to carbon from hydrocarbon(s) mole ratio in the gaseous feed is in the range of from 0.01 to 0.6.

In another embodiment of the invention, the steam to oxygen mole ratio in the gaseous feed is in the range of from 0.0 to 10.0.

In another embodiment of the invention, the carbon dioxide to oxygen mole ratio in the gaseous feed is in the range from 0.0 to 5.0.

In another embodiment of the invention, the gaseous feed has a space velocity in the range of from 5 $dm^3/g_{catalyst}/h$ to 1000 $dm^3/g_{catalyst}/h$.

In another embodiment of the invention, the contacting is carried out at a temperature in the range from 600° C. to 1200° C.; and pressure of at least 1 atm.

In a further embodiment of the invention, the oxygen to carbon mole ratio in the feed is between 0.4 to 0.6.

In a further embodiment of the invention, the steam to oxygen mole ratio in the feed is between 0.0 and 2.0.

In a further embodiment of the invention, the carbon dioxide to oxygen mole ratio in the feed is between 0.0 and 1.0.

In a further embodiment of the invention, the space velocity of the gaseous feed is between 10 $dm^3/g_{catalyst}/h$ and 500 $dm^3/g_{catalyst}/h$.

In a further embodiment of the invention, the reaction temperature is between 700° C. and 1000° C.

In another embodiment of the invention, the continuous gas-solid catalyst contactor is fixed catalyst bed reactor.

The main finding of this invention is that, the supported non-noble metal catalyst of this invention is thermally stable at high temperatures (at or above 1400° C.) or even when subjected to high temperature (above about 2000° C.) shocks by its direct exposure to an acetylene-oxygen flame. After calcination at 1400° C. for 4 h or direct exposure to an acetylene-oxygen flame for 30 min, or even after subjecting it to high temperature shocks by heating it directly by an acetylene-oxygen flame for 30 s and suddenly cooling it to a temperature below 100° C. and repeating the heating and cooling cycle for 6 times, the catalyst of this invention shows high catalytic activity and selectivity for partial oxidation of methane to syngas in the presence or absence of steam and/or carbon dioxide in the feed and also showed no disintegration of the catalyst particles.

DETAILED DESCRIPTION OF THE INVENTION

The present invention provides a high temperature stable supported non-noble metal catalyst, represented by the formula:

$NiCo_aCe_bMg_cY_dO_x(y)/S$ where S is a low surface area macroporous highly sintered solid support essentially comprising zirconium and hafnium oxides with less than 3 wt % silica and/or alumina and with a surface area of less than 1.0 m²/g and pore diameter greater than 0.1 micron. The catalyst is preferably in the form of a pellet, ring, monolith or granules. In the above formula of the catalyst, Ni, Co, Ce, Mg, Y and O are nickel, cobalt, cerium, magnesium, yttrium and oxygen, respectively and a is Co/Ni mole ratio and is preferably in the range of from 0.01 to 10; b is Ce/Ni mole ratio and is in the range of from 0.001 to 10; c is Mg/Ni mole ratio and is in the range of from 0.001 to 10; d is Y/Ni mole ratio and is in the range from 0.005 to 5; x is the number of oxygen atoms required to fulfil the valance requirement of the metallic elements, $NiCo_aCe_bMg_cY_d$; and y is weight percent loading of the active catalyst mass, $NiCo_a$-$Ce_bMg_cY_dO_x$, on the support, S, and is in the range of from 0.7% to 70%. The catalyst of the invention is useful for the autothermal reforming or partial oxidation of hydrocarbon(s) to syngas (a mixture of hydrogen and carbon monoxide) and is catalytically very active when heated at a temperature equal to or above 1400° C. or even when subjected to high temperature shocks by heating it directly by an acetylene-oxygen flame and suddenly cooling it to a temperature below 100° C. and repeating the heating and cooling cycle atleast for five times.

In the catalyst of the invention, the preferred Co/Ni mole ratio, a, is between 0.1 and 1.0; the preferred Ce/Ni mole ratio, b, is between 0.01 and 2.0; the preferred Mg/Ni mole ratio, c, is between 0.01 and 2.0; the preferred Y/Ni mole ratio, d, is between 0.02 and 0.5; and the preferred weight percentage loading of the active catalyst mass on the support, y, is between 5% and 50%.

In the catalyst of this invention, the support, S is very critical. It should contain metal oxides, such as alumina, silica and the like, which react with nickel and/or cobalt compound at high temperature with the formation of catalytically inactive binary metal oxides, only at a very low concentration, below about 3 wt %. It should also be highly sintered so that it is not further sintered during high temperature operation in the catalytic processes and provides a thermally stable surface for the catalytically active mass deposited on the support. The support should also be macroporous with pore diameter above about 0.1 micron size so that most of the active catalyst mass is essentially deposited on the inner surface of the support and there by of removal of the catalytically active mass from the support is avoided.

The catalyst of this invention can be prepared by depositing a mixture of compounds of nickel, cobalt, cerium, magnesium and yttrium, which on thermal decomposition are converted into respective metal oxides, by impregnation or co-precipitation methods, on the support, while choosing the desire Co/Ni, Ce/Ni, Mg/Ni and Y/Ni mole ratios and the weight percentages loading of the metal oxides on the support, and then decomposing the metal compounds deposited on the support at an effective temperature and calcining the decomposed catalyst mass at a temperature above 1200° C., preferably at about 1400° C.

In the catalyst of this invention, the role of support, S, is to provide a robust macroporous matrix, which is highly sintered and chemically inert and have high stability against sintering and disintegration when subjected to high temperatures and/or high temperature thermal shocks or even to direct flames and also have very high mechanical strength and attrition resistance, for depositing the catalytic mass, $NiCo_aCe_b$-$Mg_cY_dO_x$. The nickel and cobalt in the catalyst are catalytically active elements for reforming of hydrocarbons to syngas. An additional role of cobalt in the catalyst is to reduce drastically the carbon deposition on the catalyst during hydrocarbon reforming. The role of cerium oxide in the catalyst is to provide redox property to the catalyst and also to provide oxygen storage in the catalyst, thereby increasing the activity of the catalyst for hydrocarbon reforming. The magnesium oxide in the catalyst forms a solid solution with both the nickel and cobalt oxides and thereby the individual nickel and cobalt cations are separated from each other and thereby a crystal growth of the nickel and cobalt in the catalyst at high temperatures is reduced. Yttrium oxide is catalytically almost inactive for hydrocarbon reforming. The yttrium oxide in the catalyst separates from each other the individual catalytically active small particles comprising nickel and cobalt deposited on the support and thereby eliminates or drastically reduces the catalyst sintering at high temperatures. For avoiding the catalyst deactivation due to its high temperature sintering, the presence of yttrium oxide in the catalyst is essential.

The present invention also provides a process for the partial oxidation of hydrocarbon(s) to a mixture of carbon monoxide and hydrogen by oxygen in the presence or absence of steam and/or carbon dioxide in the feed, using a high temperature stable supported non-noble metal catalyst, represented by the formula:

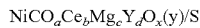
$NiCo_aCe_bMg_cY_dO_x(y)/S$ wherein, S is a low surface area macroporous highly sintered solid support essentially comprising zirconium and hafnium oxides with less than 3 wt % silica and/or alumina and having surface area less than 1.0 m²/g and pore diameter greater than 0.1 micron, in a form of pellet, ring, monolith or granules; Ni, Co, Ce, Mg, Y and O are nickel, cobalt, cerium, magnesium, yttrium and oxygen, respectively; a is Co/Ni mole ratio in the range from 0.01 to 10; b is Ce/Ni mole ratio in the range from 0.001 to 10; c is Mg/Ni mole ratio in the range from 0.001 to 10; d is Y/Ni mole ratio in the range from 0.005 to 5; x is number of oxygen atoms required to fulfil the valance requirement of the metallic elements, $NiCo_aCe_bMg_cY_d$; and y is weight percent loading of the active catalyst mass, $NiCo_a$-$Ce_bMg_cY_dO_x$, on the support, S, in the range from 0.7% to 70%. The process of conversion of the gaseous hydrocarbon feed to syngas comprises:

(i) Pretreating the catalyst by hydrogen with or without an inert gas at a temperature above 800° C.; and (ii) contacting with the high temperature stable catalyst a gaseous feed comprising hydrocarbon(s) and oxygen with or without steam and/or carbon dioxide in a continuous gas-solid catalyst contactor at the following reaction conditions: oxygen to carbon from hydrocarbon(s) mole ratio in the gaseous feed in the range from 0.01 to 0.6; steam to oxygen mole ratio in the gaseous feed in the range from zero to 10.0; carbon dioxide to oxygen mole ratio in the gaseous feed in the range from zero to 5.0; space velocity of the gaseous feed in the range from 5 dm³/g$_{catalyst}$/h to 1000 dm³/g$_{catalyst}$/h; reaction temperature in the range from 600° C. to 1200° C.; and pressure of at least 1 atm.

The hydrogen pretreatment to the catalyst of this invention by hydrogen is essential for reducing atleast part of the nickel and cobalt to their metallic form, which is responsible for the hydrocarbon(s) reforming activity of the catalyst. The hydrocarbon pretreatment to the catalyst may be carried out in the same gas-solid catalyst contactor employed in the second step of the process of this invention or it may also be carried out separately in a different gas-solid catalyst contactor. However, insitu hydrogen pretreatment to the catalyst charged in the gas-solid catalyst contactor used in the second step of the process is preferable. In the hydrogen pretreatment, the hydrogen stream used may or may not contain an inert gas such as nitrogen, helium and argon. In the absence of the hydrogen pretreatment, the catalyst may not show high activity in the hydrocarbon(s) reforming and/or may require a very long period to attend its steady activity in the process of this invention.

In the second step of the process of this invention, the preferred oxygen to carbon mole ratio in the feed ranges from 0.40 to 0.60; the preferred steam to oxygen mole ratio in the feed ranges from 0 to 2.0; the preferred carbon dioxide to oxygen mole ratio in the feed ranges from 0 to 1.0; the preferred space velocity of the gaseous feed ranges from 10 dm³/g$_{catalyst}$/h to 500 dm³/g$_{catalyst}$/h; the preferred reaction temperature ranges from 700° C. to 1000° C.; and the preferred continuous gas-solid, catalyst contactor may be a fixed bed catalytic reactor.

A number of gas-solid catalyst contactors, such as fluid bed and fixed bed catalytic reactors are known in the prior art.

The process of this invention can be operated non-adiabatically in a single shallow fixed bed reactor or multiple shallow foxed bed reactors connected in series or in parallel or in radial flow reactor, with an arrangement for removing heat from the reactor(s) or providing heat to the reactor(s) by known methods. It may also be operated adiabatically in a tubular shallow fixed bed reactor with its length diameter ratio below 5 or in a radial flow fixed bed reactor.

In the process, the products formed are carbon monoxide and hydrogen as major products and water and carbon dioxide as minor products. The gaseous product stream comprises hydrogen, carbon monoxide, carbon dioxide, water and unconverted hydrocarbon.

The feed used in the process of this invention comprises oxygen and one or more hydrocarbons, represented by a general formula: $C_nH_{2n+2}$, wherein, C is carbon, H is hydrogen, n is an integer having a value of 1 or greater than 1, with or without steam and/or carbon dioxide. The hydrocarbon(s), oxygen, steam and carbon dioxide present in the feed are reactants. In the absence of steam and/or carbon dioxide in the feed, following two major reactions occurs simultaneously in this process of this invention: (1) partial oxidation of hydrocarbon(s) to carbon monoxide and hydrogen, which is a mildly exothermic reaction and (2) combustion of part of hydrocarbon(s) to carbon dioxide and water, which is highly exothermic reaction. When steam is present along with oxygen and hydrocarbon in the feed, the major reactions occurring simultaneously in the process are (1) mildly exothermic partial oxidation of hydrocarbon(s) to carbon monoxide and hydrogen, (2) endothermic steam reforming of hydrocarbon(s) to carbon monoxide and hydrogen and (3) exothermic water gas shift reaction involving a reaction between carbon monoxide and steam to carbon dioxide and hydrogen. When carbon dioxide is present along with oxygen and hydrocarbon in the feed, the major reactions occurring simultaneously in the process are (1) mildly exothermic partial oxidation of hydrocarbon(s) to carbon monoxide and hydrogen, (2) endothermic carbon dioxide reforming of hydrocarbon(s) to carbon monoxide and hydrogen and (3) endothermic reverse water gas shift reaction involving hydrogenation of carbon dioxide to carbon monoxide and water. However, when both the steam and carbon dioxide are present in the feed along with oxygen and hydrocarbon, the major reactions occurring simultaneously in the process are mildly exothermic partial oxidation of hydrocarbon(s) to carbon monoxide and hydrogen and endothermic steam and carbon dioxide reforming of hydrocarbon(s) to carbon monoxide and hydrogen. Thus in the presence of steam and/or carbon dioxide in the feed along with oxygen and hydrocarbon(s), both the exothermic and endothermic reactions are coupled in the process of this invention, making the process highly energy efficient, requiring little or no external energy and eliminating or reducing hot spot formation on the catalyst and thereby also making the process non-hazardous.

In the process of this invention, 100 percent selectivity, based on the hydrocarbon(s) converted, for hydrogen, for carbon monoxide and for both can be achieved by adding steam, carbon dioxide and both steam and carbon dioxide, respectively, in the feed and also nearly 100 percent conversion of hydrocarbon(s) can be achieved.

Since the catalyst used in the process of this invention is thermally stable against sintering or deactivation and also has high mechanical strength and attrition resistance when subjected to high temperature about 1400° C. and high temperature shocks, the process can very well be carried out in the absence of steam and/or carbon dioxide in the feed with high hydrocarbon(s) conversion and high selectivity for both hydrogen and carbon monoxide at high space velocity or low contact time.

In the process of this invention, a $H_2/CO$ product mole ratio of about 2.0 can be obtained in the absence or presence of both carbon dioxide and steam in the feed. The product ratio above about 2.0 can be obtained in the presence of steam but absence of carbon dioxide in the feed. Whereas, the product ratio below about 2.0 can be obtained in the presence of carbon dioxide but absence of steam in the feed.

In the process of this invention, above 98 percentage conversion of methane with above 98 percentage selectivity for both hydrogen and carbon monoxide can be obtained in the catalytic partial oxidation of methane using a high temperature stable catalyst of this invention, which was precalcined at 1400° C. for 4 h or exposed directly to an acetylene-oxygen flame for 30 min or even repeatedly exposed directly to the flame before its use in the process.

The present invention is described with respect to the following examples. These are provided for illustrative purposes only and are not to be construed as limitations on the invention.

Definition of Terms Used

Total conversion of methane (%)=mole % of the methane converted to all the products.

Selectivity for hydrogen (%)=100×[Conversion of methane to hydrogen (%)]/[Total conversion of methane (%)].

Selectivity for carbon monoxide (%)=100×[Conversion of methane to carbon monoxide (%)]/[Total conversion of methane (%)]

Conversion of a methane to a particular product=mole % of the methane converted to the particular product.

Productivity for a particular product $(mol.g^{-1}.h^{-1})$=moles of the product formed in the process per gram of catalyst per hour.

Gas hourly space velocity, GHSV=Volume of gaseous reactant mixture, measured at a temperature 0° C. and 1 atm pressure, passed over a unit mass of catalyst per hour.

A non-adiabatic reactor or reactor operated non-adiabatically means that heat is removed from the reactor or provided to the reactor by external means to maintain the desired reaction temperature. Whereas, in case of adiabatic reactor no heat is removed from the reactor or provided to the reactor.

SZ5564 used in the examples is a highly sintered low surface area macroporous commercial catalyst carrier, obtained from Norton Company, USA. It has a surface area less than 0.1 $m^2g^{-1}$, pore volume of 0.15 $cm^3g^{-1}$, porosity of 45% and pore diameter between 0.1 micron and 100 micron and also has high mechanical strength and attrition resistance. It composed mainly of refractory zirconium and hafnium oxides (>94 wt %) with small amounts of silica (1.6 wt %) and alumina (0.4 wt %).

EXAMPLE-1

This example describes the preparation of the catalyst of this invention, having a formula $NiCo_{0.2}Ce_{0.01}Mg_{1.2}Y_{0.1}O_x$ (21.2 wt %)/SZ5564, and also illustrates its high catalytic activity and selectivity in the partial oxidation of methane to syngas, when the catalyst is calcined at 1400° C. or even when the high temperature calcined catalyst is further subjected to a higher temperature by exposing it to an acetylene-oxygen flame or to a number of high temperature shocks.

The catalyst was prepared by impregnating a mixture of 14.5 mmol nickel nitrate, 2.9 mmol cobalt nitrate, 17.5 mmol magnesium nitrate, 0.145 mmol ammonium cerium nitrate and 1.5 mmol yttrium nitrate, dissolved in 3 ml distilled water, on 22-30 mesh size particles of a commercial SZ5564 catalyst support (10 g), containing mainly zirconium and hafnium oxides, obtained from Norton company, USA, drying the impregnated solid mass at 100° C. and then decomposing the metal nitrates, deposited on the support, to corresponding metal oxides, at a temperature 600° C. for 4 h. The decomposed solid mass was then calcined in a furnace at 1400° C. for 4 h.

The performance of the catalyst calcined at 1400° C. in the partial oxidation of methane to syngas was tested using a non-adiabatic tubular quartz reactor (internal diameter: 15 mm) packed with the catalyst (0.2 g). The reactor was kept in a tubular furnace. The reactor temperature was measured and controlled by a chromel-alumina thermocouple provided in the center of the catalyst bed. The catalyst in the reactor was first reduced by a reducing gas containing 50 vol % $H_2$ in $N_2$ with a GHSV of 15,000 $cm^3g^{-1}h^{-1}$ at 900° C. for 1 h and then the partial oxidation of methane was carried out by passing continuously a gaseous feed containing pure methane and oxygen over the catalyst at the following reaction conditions:

| | |
|---|---|
| $O_2/CH_4$ mole ratio in the feed | 0.55 |
| GHSV | 62,000 $cm^3g^{-1}h^{-1}$ |
| Temperature | 900° C. |
| Pressure (atm) | 1.0 atm |

The gaseous products (after condensing the water from the product stream at 0° C.) were analyzed by an on-line gas chromatograph using a spherocarb column. The results are given in Table 1.

The catalyst calcined at 1400° C. was further subjected directly to an acetylene-oxygen flame for 30 min and then its performance for the partial oxidation of methane was evaluated as above. The results are included in Table 1.

The catalyst calcined at 1400° C. was subjected to high temperature shocks by exposing it directly to an acetylene-oxygen flame for 30 s and then the catalyst was suddenly cooled in an air until its temperature was below 100° C. The flame heating and air-cooling cycle was repeated for 6 times and then the performance of the catalyst in the partial oxidation of methane was evaluated as described above. The results are included in Table 1.

When the catalyst was calcined at 900° C. instead of at 1400° C. and its performance for the partial oxidation of methane was evaluated as described above, there was no significant increase in the methane conversion activity of the catalyst and also no significant a change in its selectivity for CO and $H_2$, as shown by the results in Table 1.

All the above results clearly show that there is only a little or no influence of the high temperature treatments to the catalyst on its performance in the partial oxidation of methane to syngas, indicating its high thermal stability against deactivation in the catalytic reaction. Also, no disintrigration of the catalyst particles was observed when the catalyst was subjected to the high temperature shocks.

TABLE 1

Results of the partial oxidation of methane over the catalyst $NiCo_{0.2}Ce_{0.01}Mg_{1.2}Y_{0.1}O_x$ (21.2 wt %)/SZ5564 calcined at 1400° C. or exposed to acetylene-oxygen flame or subjected to the high temperature shocks.

| High temperature | Methane | Selectivity | Productivity |

| treatment given to the catalyst | conversion (%) | Selectivity (%) CO | Selectivity (%) H$_2$ | Productivity (molg$^{-1}$h$^{-1}$) CO | Productivity (molg$^{-1}$h$^{-1}$) H$_2$ |
|---|---|---|---|---|---|
| Calcined in furnace at 1400° C. for 4 h | 98.7 | 98.8 | 98.1 | 0.96 | 1.92 |
| Directly exposed to acetylene-oxygen flame for 30 min | 98.2 | 98.6 | 98.4 | 0.96 | 1.92 |
| Subjected to the high temperature shocks | 98.1 | 97.9 | 98.1 | 0.95 | 1.90 |
| Calcined at 900° C. instead of at 1400° C. | 98.9 | 98.7 | 98.6 | 0.97 | 1.93 |

EXAMPLE-2

This example describes the preparation of the catalyst of this invention, having a formula NiCu$_{0.2}$Ce$_{1.2}$Mg$_{1.2}$Y$_{0.03}$O$_x$ (50.2 wt %)/SZ5564, and also illustrates its high catalytic activity and selectivity in the partial oxidation of methane to syngas, when the catalyst is calcined at 1400° C. or even when the high temperature calcined catalyst is further subjected to a higher temperature by exposing it to an acetylene-oxygen flame or to a number of high temperature shocks.

The catalyst was prepared by the method same as that described in Example 1 except that the amount of ammonium cerium nitrate was 17.5 mmol instead of 0.145 mmol and that of yttrium nitrate was 0.44 mmol instead of 1.5 mmol.

The performance of the catalyst calcined at 1400° C. for the partial oxidation of methane to syngas was tested by following the method same as that described in Example 1 except that the GHSV was 1,20,000 cm$^3$g$^{-1}$h$^{-1}$ instead of 62,000 cm$^3$g$^{-1}$h$^{-1}$. The results are given in Table 2.

The catalyst calcined at 1400° C. was further subjected directly to an acetylene-oxygen flame for 30 min and then its performance for the partial oxidation of methane was evaluated as above. The results are included in Table 2.

The catalyst calcined at 1400° C. was subjected to high temperature shocks by following the method same as that described in Example 1 and then the performance of the catalyst in the partial oxidation of methane was evaluated as described above. The results are included in Table 2. No disintrigration of the catalyst particles was observed when the catalyst was subjected to the high temperature shocks.

TABLE 2

Results of the partial oxidation of methane over the catalyst NiCo$_{0.2}$Ce$_{1.2}$Mg$_{1.2}$Y$_{0.03}$O$_x$ (50.2 wt %)/SZ5564 calcined at 1400° C. or exposed to acetylene-oxygen flame or subjected to the high temperature shocks.

| High temperature treatment given to the catalyst | Methane conversion (%) | Selectivity (%) CO | Selectivity (%) H$_2$ | Productivity (molg$^{-1}$h$^{-1}$) CO | Productivity (molg$^{-1}$h$^{-1}$) H$_2$ |
|---|---|---|---|---|---|
| Calcined in furnace at 1400° C. for 4 h | 96.9 | 98.2 | 98.6 | 1.82 | 3.65 |
| Directly exposed to acetylene-oxygen flame for 30 min | 97.8 | 98.5 | 98.5 | 1.84 | 3.68 |
| Subjected to the high temperature shocks | 96.8 | 97.8 | 98.8 | 1.80 | 3.62 |

EXAMPLE-3

This example describes the preparation of the catalyst of this invention, having a formula NiCu$_{0.2}$Ce$_{0.84}$Mg$_{0.05}$Y$_{0.2}$O$_x$ (36.9 wt %)/SZ5564, and also illustrates its high catalytic activity and selectivity in the partial oxidation of methane to syngas, when the catalyst is calcined at 1400° C. or even when the high temperature calcined catalyst is further subjected to a higher temperature by exposing it to an acetylene-oxygen flame or to a number of high temperature shocks.

The catalyst was prepared by the method same as that described in Example 1 except that the amount of ammonium cerium nitrate was 12.2 mmol instead of 0.145 mmol and that of yttrium nitrate was 2.9 mmol instead of 1.5 mmol and also that of magnesium nitrate was 0.73 mmol instead of 17.5 mmol.

The performance of the catalyst calcined at 1400° C. for the partial oxidation of methane to syngas was tested by following the method same as that described in Example 1. The results are given in Table 3.

The catalyst calcined at 1400° C. was further subjected directly to an acetylene-oxygen flame for 30 min and then its performance for the partial oxidation of methane was evaluated as above. The results are included in Table 3.

The catalyst calcined at 1400° C. was subjected to high temperature shocks by following the method same as that described in Example 1 and then the performance of the catalyst in the partial oxidation of methane was evaluated as described above. The results are included in Table 3. No disintrigration of the catalyst particles was observed when the catalyst was subjected to high temperature shocks.

TABLE 3

Results of the partial oxidation of methane over the catalyst NiCo$_{0.2}$Ce$_{0.84}$Mg$_{0.05}$Y$_{0.2}$O$_x$ (36.9 wt %)/SZ5564 calcined at 1400° C. or exposed to acetylene-oxygen flame or subjected to the high temperature shocks.

| High temperature treatment given to the catalyst | Methane conversion (%) | Selectivity (%) CO | Selectivity (%) H$_2$ | Productivity (molg$^{-1}$h$^{-1}$) CO | Productivity (molg$^{-1}$h$^{-1}$) H$_2$ |
|---|---|---|---|---|---|
| Calcined in furnace at 1400° C. for 4 h | 96.3 | 96.4 | 97.2 | 0.92 | 1.85 |
| Directly exposed to acetylene-oxygen flame for 30 min | 95.9 | 96.3 | 97.4 | 0.91 | 1.83 |
| Subjected to the high temperature shocks | 96.1 | 96.6 | 97.6 | 0.92 | 1.86 |

EXAMPLE-4

This comparative example illustrates a beneficial effect of the presence of yttrium oxide and cerium oxide in the catalyst, avoiding or reducing sintering of the catalyst.

The surface area of the catalysts prepared in Example 1 and Example 2 was found to be 0.25 m$^2$g$^{-1}$ and 0.30 m$^2$g$^{-1}$, respectively. However, when these two catalysts were prepared without cerium oxide and yttrium oxide, the resulting catalyst NiCu$_{0.2}$Mg$_{1.2}$O$_x$ (20 wt %)/SZ5564 was found to have a surface area of less than 0.1 m g$^{-1}$. This clearly show that the catalyst sintering during high temperature (1400° C.) calcination of the catalyst is avoided or reduced because of the presence of yttrium oxide and cerium oxide in the catalyst.

The surface area was measured by the single point BET method, using Monosorb Surface Area Analyzer (Quantachrome Corp., USA)

EXAMPLE-5

This comparative example further illustrates the high activity of the catalyst of this invention for the steam reforming of methane to syngas particularly when the catalyst comprises cerium and yttrium oxides; in the absence of these metal oxides, the catalyst shows much lower activity for the steam reforming.

The steam reforming of methane over the catalyst $NiCu_{0.2}Ce_{1.2}Mg_{1.2}Y_{0.03}O_x$ (50.2 wt %)/SZ5564, prepared in Example 2, and also over the catalyst $NiCu_{0.2}Mg_{1.2}O_x$ (20 wt %)/SZ5564, prepared in Example 4, both the catalysts calcined at 1400° C., was carried out using the reactor and method same as that described in Example 1 except that the gaseous feed was a mixture of pure methane and steam with steam/methane mole ratio of 3.0 and GHSV of 20,000 $cm^3g^{-1}h^{-1}$ instead of a mixture of pure methane and oxygen with oxygen/methane mole ratio of 0.55 and GHSV of 62,000 $cm^3g^{-1}h^{-1}$. The results for the two catalysts are compared in Table 4.

TABLE 4

Comparison of the catalysts for their performance in the steam reforming of methane

| Catalyst | Methane conversion (%) | Selectivity (%) CO | Selectivity (%) H$_2$ | Productivity (mol g$^{-1}$ h$^{-1}$) CO | Productivity (mol g$^{-1}$ h$^{-1}$) H$_2$ |
|---|---|---|---|---|---|
| NiCo$_{0.2}$Ce$_{1.2}$Mg$_{1.2}$Y$_{0.03}$O$_x$ (50.2 wt %)/SZ5564 | 98.8 | 67.9 | 100 | 0.15 | 0.52 |
| NiCo$_{0.2}$Mg$_{1.2}$O$_x$ (20 wt %)/SZ5564 | 73.5 | 61.9 | 100 | 0.10 | 0.36 |

EXAMPLE-6

This comparative example further illustrates the high activity of the catalyst of this invention for the carbon dioxide reforming of methane to syngas, particularly when the catalyst comprises cerium and yttrium oxides; in the absence of these metal oxides, the catalyst shows much lower activity for the carbon dioxide reforming.

The carbon dioxide reforming of methane over the catalyst $NiCO_{0.2}Ce_{1.2}Mg_{1.2}Y_{0.03}O_x$ (50.2 wt %)/SZ5564, prepared in Example 2, and also over the catalyst $NiCu_{0.2}Mg_{1.2}O_x$ (20 wt %)/SZ5564, prepared in Example 4, both the catalysts calcined at 1400° C., was carried out using the reactor and method same as that described in Example 1 except that the gaseous feed was a mixture of pure methane and carbon dioxide with carbon dioxide/methane mole ratio of 1.1 and GHSV of 20,000 $cm^3g^{-1}h^{-1}$ instead of a mixture of pure methane and oxygen with oxygen/methane mole ratio of 0.55 and GHSV of 62,000 $cm^3g^{-1}h^{-1}$. The results for the two catalysts are compared in Table 5.

TABLE 5

Comparison of catalysts for their performance in the carbon dioxide reforming of methane

| Catalyst | Methane conversion (%) | Selectivity (%) CO | Selectivity (%) H$_2$ |
|---|---|---|---|
| NiCo$_{0.2}$Ce$_{1.2}$Mg$_{1.2}$Y$_{0.03}$O$_x$ (50.2 wt %)/SZ5564 | 95.1 | 100 | 97.6 |
| NiCo$_{0.2}$Mg$_{1.2}$O$_x$ (20 wt %)/SZ5564 | 43.8 | 100 | 93.1 |

EXAMPLES 7-27

These examples illustrate the process of this invention for the partial oxidation of methane to syngas in the presence or absence of steam and/or CO$_2$ in the feed, using the high temperature stable catalyst of this invention.

The process over the catalysts prepared in Examples 1-3 was carried out in the reactor and by the method same as that described in Example 1 except that the concentration of hydrogen and/or the inert gas in the reducing gas used for the reduction of the catalyst in the first step was different and also the reaction conditions used for the partial oxidation of methane in the second step were different, as given in Table 6. The results are presented in Table 6.

TABLE 6

Results of the partial oxidation of methane in the presence or absence of steam or CO$_2$ in the feed

| | Example 7 | Example 8 | Example 9 |
|---|---|---|---|
| Catalyst used | Catalyst prepared in Example 2 | Same as that used in Example 7 | Same as that used in Example 8 |
| Concentration of H$_2$ in the reducing gas used in step-I | 30% H$_2$ in N$_2$ | 50% H$_2$ in He | 100% H$_2$ |
| Reaction conditions in step-II | | | |
| O$_2$/CH$_4$ mole ratio in feed | 0.55 | 0.55 | 0.55 |
| H$_2$O/CH$_4$ mole ratio in feed | 0.0 | 0.0 | 0.0 |
| CO$_2$/CH$_4$ mole ratio in feed | 0.0 | 0.0 | 0.0 |
| GHSV of feed gas (cm$^3$g$^{-1}$h$^{-1}$) | 2,00,000 | 62,000 | 50,000 |
| Temperature (° C.) | 1000 | 850 | 650 |
| Pressure (atm) | 1.1 | 1.1 | 1.1 |
| Results | | | |
| Conversion of CH$_4$ (%) | 99.9 | 95.7 | 84.3 |
| Selectivity for CO (%) | 99.8 | 97.4 | 86.6 |
| Selectivity for H$_2$ (%) | 99.7 | 96.8 | 96.4 |

TABLE 6-continued

Results of the partial oxidation of methane in the presence or absence of steam or $CO_2$ in the feed

|  | Example 10 | Example 11 | Example 12 |
|---|---|---|---|
| Catalyst used | Same as that used in Example 9 | Catalyst prepared in Example 3 | Same as that in Example 11 |
| Concentration of $H_2$ in the reducing gas used in step-I | 40% $H_2$ in $N_2$ | 60% $H_2$ in $N_2$ | 90% $H_2$ in $N_2$ |
| Reaction conditions in step-II | | | |
| $O_2/CH_4$ mole ratio in feed | 0.50 | 0.50 | 0.50 |
| $H_2O/CH_4$ mole ratio in feed | 0.17 | 0.17 | 0.17 |
| $CO_2/CH_4$ mole ratio in feed | 0.0 | 0.0 | 0.0 |
| GHSV of feed gas ($cm^3 g^{-1} h^{-1}$) | 46,000 | 46,000 | 46,000 |
| Temperature (° C.) | 900 | 850 | 800 |
| Pressure (atm) | 1.0 | 1.1 | 1.2 |
| Results | | | |
| Conversion of $CH_4$ (%) | 98.7 | 89.1 | 85.7 |
| Selectivity for CO (%) | 94.2 | 94.5 | 86.4 |
| Selectivity for $H_2$ (%) | 100 | 100 | 100 |

|  | Example | | |
|---|---|---|---|
|  | Example 13 | Example 14 | Example 15 |
| Catalyst used | Catalyst prepared in Example 2 and subjected to acetylene-oxygen flame for 30 min | Same as that used in Example 12 | Same as that used in Example 14 |
| Concentration of $H_2$ in the reducing gas used in step-I | 40% $H_2$ in $N_2$ | 40% $H_2$ in $N_2$ | 40% $H_2$ in $N_2$ |
| Reaction conditions in step-II | | | |
| $O_2/CH_4$ mole ratio in feed | 0.50 | 0.50 | 0.50 |
| $H_2O/CH_4$ mole ratio in feed | 0.09 | 0.24 | 0.55 |
| $CO_2/CH_4$ mole ratio in feed | 0.0 | 0.0 | 0.0 |
| GHSV of feed gas ($cm^3 g^{-1} h^{-1}$) | 49,000 | 49,000 | 49,000 |
| Temperature (° C.) | 850 | 850 | 8850 |
| Pressure (atm) | 1.0 | 1.0 | 1.0 |
| Results | | | |
| Conversion of $CH_4$ (%) | 94.9 | 95.5 | 96.1 |
| Selectivity for CO (%) | 93.9 | 90.6 | 80.8 |
| Selectivity for $H_2$ (%) | 100 | 100 | 100 |

|  | Example | | |
|---|---|---|---|
|  | Example 16 | Example 17 | Example 18 |
| Catalyst used | Catalyst prepared in Example 1 | Same as that used in Example 16 | Same as that used in Example 17 |
| Concentration of $H_2$ in the reducing gas used in step-I | 50% $H_2$ in $N_2$ | 50% $H_2$ in $N_2$ | 50% $H_2$ in $N_2$ |
| Reaction conditions in step-II | | | |
| $O_2/CH_4$ mole ratio in feed | 0.55 | 0.55 | 0.55 |
| $H_2O/CH_4$ mole ratio in feed | 0.0 | 0.0 | 0.0 |
| $CO_2/CH_4$ mole ratio in feed | 0.0 | 0.0 | 0.0 |
| GHSV of feed gas ($cm^3 g^{-1} h^{-1}$) | 2,00,000 | 62,000 | 50,000 |
| Temperature (° C.) | 1000 | 850 | 650 |
| Pressure (atm) | 1.1 | 1.1 | 1.1 |
| Results | | | |
| Conversion of $CH_4$ (%) | 99.7 | 95.7 | 84.3 |
| Selectivity for CO (%) | 99.6 | 97.4 | 96.4 |
| Selectivity for $H_2$ (%) | 99.5 | 96.8 | 86.6 |

|  | Example | | |
|---|---|---|---|
|  | Example 19 | Example 20 | Example 21 |
| Catalyst used | Same as that in Example 18 | Same as that used in Example 19 | Same as that in Example 20 |

TABLE 6-continued

Results of the partial oxidation of methane in the presence or absence of steam or $CO_2$ in the feed

| | | | |
|---|---|---|---|
| Concentration of $H_2$ in the reducing gas used in step-I | 50% $H_2$ in $N_2$ | 50% $H_2$ in $N_2$ | 50% $H_2$ in $N_2$ |
| Reaction conditions in step-II | | | |
| $O_2/CH_4$ mole ratio in feed | 0.50 | 0.50 | 0.50 |
| $H_2O/CH_4$ mole ratio in feed | 0.09 | 0.17 | 0.55 |
| $CO_2/CH_4$ mole ratio in feed | 0.0 | 0.0 | 0.0 |
| GHSV of feed gas ($cm^3 g^{-1} h^{-1}$) | 49,000 | 49,000 | 49,000 |
| Temperature (° C.) | 850 | 850 | 850 |
| Pressure (atm) | 1.1 | 1.1 | 1.1 |
| Results | | | |
| Conversion of $CH_4$ (%) | 95.7 | 97.1 | 97.3 |
| Selectivity for CO (%) | 92.4 | 91.7 | 86.3 |
| Selectivity for $H_2$ (%) | 100 | 100 | 100 |

| | Example | | |
|---|---|---|---|
| | Example 22 | Example 23 | Example 24 |
| Catalyst used | Same as that in Example 15 | Same as that in Example 22 | Same as that in Example 23 |
| Concentration of $H_2$ in the reducing gas used in step-I | 40% $H_2$ in $N_2$ | 50% $H_2$ in $N_2$ | 100% $H_2$ |
| Reaction conditions in step-II | | | |
| $O_2/CH_4$ mole ratio in feed | 0.50 | 0.50 | 0.50 |
| $H_2O/CH_4$ mole ratio in feed | 0.0 | 0.0 | 0.17 |
| $CO_2/CH_4$ mole ratio in feed | 0.14 | 0.14 | 0.14 |
| GHSV of feed gas ($cm^3 g^{-1} h^{-1}$) | 46,000 | 46,000 | 46,000 |
| Temperature (° C.) | 900 | 850 | 900 |
| Pressure (atm) | 1.1 | 1.1 | 1.1 |
| Results | | | |
| Conversion of $CH_4$ (%) | 96.9 | 90.4 | 97.1 |
| Selectivity for CO (%) | 100 | 100 | 100 |
| Selectivity for $H_2$ (%) | 91.0 | 96.8 | 100 |

| | Example | | |
|---|---|---|---|
| | Example 25 | Example 26 | Example 27 |
| Catalyst used | Same as that in Example 21 | Same as that in Example 25 | Catalyst prepared and given high temperature shocks in Example 2 |
| Concentration of $H_2$ in the reducing gas used in step-I | 50% $H_2$ in $N_2$ | 50% $H_2$ in $N_2$ | 50% $H_2$ in $N_2$ |
| Reaction conditions in step-II | | | |
| $O_2/CH_4$ mole ratio in feed | 0.50 | 0.50 | 0.50 |
| $H_2O/CH_4$ mole ratio in feed | 0.0 | 0.0 | 0.3 |
| $CO_2/CH_4$ mole ratio in feed | 0.14 | 0.14 | 0.24 |
| GHSV of feed gas ($cm^3 g^{-1} h^{-1}$) | 46,000 | 46,000 | 41,000 |
| Temperature (° C.) | 900 | 850 | 950 |
| Pressure (atm) | 1.1 | 1.1 | 1.1 |
| Results | | | |
| Conversion of $CH_4$ (%) | 91.3 | 83.2 | 99.5 |
| Selectivity for CO (%) | 100 | 100 | 100 |
| Selectivity for $H_2$ (%) | 90.5 | 92.1 | 100 |

The important features and main advantages of this invention over the prior art catalyst and catalytic process for the conversion of hydrocarbon(s) to syngas or hydrogen and carbon monoxide by autothermal reforming or catalytic partial oxidation are as follows:

1) Unlike the prior art catalysts used for autothermal reforming, the catalyst of this invention does not contain any noble metal; it contains nickel, cobalt, magnesium, cerium and yttrium elements which are much cheaper than noble metals, and hence the catalyst of this invention is much cheaper.

2) The catalyst of this invention has high mechanical strength and resistance to attrition and also has high catalytic activity and selectivity in the process of this invention and also in steam reforming of methane, even when it is subjected to high temperatures (at or above 1400° C.) and also even when it is subjected to very high temperature shocks (at about 2000° C.) by its direct exposure to an acetylene-oxygen flame.

3) The catalyst of this invention has very high thermal stability against its fouling (deactivation and/or disintrigration into small particles) and hence it is particularly useful for the autothermal reforming and catalytic partial oxidation processes in which the catalyst is subjected to high temperatures (at or above 1400° C.) and/or subjected to very high temperature shocks (at about 2000° C.).

4) Unlike the prior art processes for the catalytic partial oxidation of hydrocarbon(s), the process of this invention uses a high temperature stable catalyst of this invention, which has high mechanical strength and resistance to attrition and more particularly has high activity and selectivity in the partial oxidation of hydrocarbon(s) to syngas in the presence and absence of steam and/or carbon dioxide in the feed, even when the catalyst is subjected to high temperatures (at or above 1400° C.) and also even when it is subjected to very high temperature shocks (at about 2000° C.) by its direct exposure to an acetylene-oxygen flame.

5) When steam and/or carbon dioxide are present in the feed of the process of this invention, the exothermic oxidative hydrocarbon conversion reactions and the endothermic steam and/or carbon dioxide reforming reactions occurs simultaneously; making it possible to achieve 100% selectivity, based on the hydrocarbon(s) converted, for hydrogen or carbon monoxide or both in the process. Moreover, because of this coupling of exothermic and endothermic reactions the process becomes highly energy efficient and more safe to operate.

6) Since the catalyst use in the process of this invention thermally and mechanically very stable, the process of this invention can also be operated adiabatically, using a simple tubular shallow bed reactor and thereby drastically reducing its capital and operating costs.

We claim:

1. A high temperature stable supported non-noble metal catalyst comprising Ni, Co, Ce, Mg, Y, and O with a formula: $NiCo_aCe_bMg_cY_dO_x(y)/S$, wherein S is a low surface area macroporous highly sintered solid support essentially comprising zirconium and hafnium oxides with less than 3 wt % silica and/or alumina and with a surface area of less than 1.0 m$^2$/g and pore diameter greater than 0.1 micron, in a form of pellet, ring, monolith or granules; wherein Ni, Co, Ce, Mg, Y and O are nickel, cobalt, cerium, magnesium, yttrium and oxygen, respectively; a is Co/Ni mole ratio; b is Ce/Ni mole ratio; c is Mg/Ni mole ratio; d is Y/Ni mole ratio; x is the number of oxygen atoms required to fulfill the valance requirement of metallic elements, $NiCo_aCe_bMg_cY_d$; and y is weight percent loading of active catalyst mass, $NiCo_aCe_bMg_cY_dO_x$, on the support, S.

2. The catalyst of claim 1 wherein a is in the range of from 0.01 to 10.

3. The catalyst of claim 1 wherein b is in the range of from 0.001 to 10.

4. The catalyst of claim 1 wherein c is in the range of from 0.001 to 10.

5. The catalyst of claim 1 wherein d is in the range from 0.005 to 5.

6. The catalyst of claim 1 wherein y is in the range from 0.7% to 70%.

7. The catalyst of claim 1 wherein a is between 0.1 and 1.0.

8. The catalyst of claim 1 wherein b is between 0.01 and 2.0.

9. The catalyst of claim 1 wherein c is between 0.01 and 2.0.

10. The catalyst of claim 1 wherein d is between 0.02 and 0.5.

11. The catalyst of claim 1 wherein y is between 5% and 50%.

12. A process for the preparation of a high temperature stable supported non-noble metal catalyst comprising Ni, Co, Ce, Mg, Y, and O with a formula: $NiCo_aCe_bMg_cY_dO_x(y)/S$, wherein S is a low surface area macroporous highly sintered solid support essentially comprising zirconium and hafnium oxides with less than 3 wt % silica and/or alumina and with a surface area of less than 1.0 m$^2$/g and pore diameter greater than 0.1 micron, in a form of pellet, ring, monolith or granules; wherein Ni, Co, Ce, Mg, Y and O are nickel, cobalt, cerium, magnesium, yttrium and oxygen, respectively; a is Co/Ni mole ratio; b is Ce/Ni mole ratio; c is Mg/Ni mole ratio; d is Y/Ni mole ratio; x is the number of oxygen atoms required to fulfill the valance requirement of metallic elements, $NiCo_aCe_bMg_cY_d$; and y is weight percent loading of active catalyst mass, $NiCo_aCe_bMg_cY_dO_x$, on the support, S, the process comprising:

(a) depositing a mixture of compounds of nickel, cobalt, cerium, magnesium and yttrium, which on thermal decomposition are convertible into their respective metal oxides, by impregnation or co-precipitation on the support, (b) decomposing the metal compounds deposited on the support at an effective temperature, and (c) calcining the decomposed catalyst mass at a temperature above 1200° C.

13. The process of claim 12 wherein the deposition in step (a) above is carried out while ensuring that the Co/Ni, Ce/Ni, Mg/Ni and Y/Ni mole ratios and the weight percentages loading of the metal oxides on the support are as follows:

a is in the range of from 0.01 to 10;
b is in the range of from 0.001 to 10;
c is in the range of from 0.001 to 10;
d is in the range from 0.005 to 5; and
y is in the range from 0.7% to 70%.

14. The process of claim 12 wherein a is between 0.1 and 1.0.

15. The process of claim 12 wherein b is between 0.01 and 2.0.

16. The process of claim 12 wherein c is between 0.01 and 2.0.

17. The process of claim 12 wherein d is between 0.02 and 0.5.

18. The process of claim 12 wherein y is between 5% and 50%.

19. The process of claim 12 wherein the calcination in step (c) is carried out at a temperature of about 1400° C.

20. A process for the partial oxidation of hydrocarbon(s) to a mixture of carbon monoxide and hydrogen by oxygen in the presence or absence of steam and/or carbon dioxide in the feed, using a high temperature stable supported non-noble metal catalyst comprising Ni, Co, Ce, Mg, Y, and O, represented by the formula $NiCo_aCe_bMg_cY_dO_x(y)/S$, wherein S is a low surface area macroporous highly sintered solid support essentially comprising zirconium and hafnium oxides with less than 3 wt % silica and/or alumina and with a surface area of less than 1.0 m$^2$/g and pore diameter greater than 0.1 micron, in a form of pellet, ring, monolith or granules; wherein Ni, Co, Ce, Mg, Y and O are nickel, cobalt, cerium, magnesium, yttrium and oxygen, respectively; a is Co/Ni mole ratio; b is Ce/Ni mole ratio; c is Mg/Ni mole ratio; d is Y/Ni mole ratio; x is the number of oxygen atoms required to fulfill the valance requirement of the metallic elements, $NiCo_aCe_bMg_cY_d$; and y is weight percent loading of the active catalyst mass, $NiCo_aCe_bMg_cY_dO_x$, on the support, S, the process comprising:

(a) pre-treating the catalyst with hydrogen at a temperature above 800° C.; and (b) contacting a gaseous feed comprising hydrocarbon(s) and oxygen with the catalyst in a continuous gas-solid catalyst contactor.

21. The process as claimed in claim 20 wherein the pre-treatment of the catalyst is carried out in the presence of an inert gas.

22. The process as claimed in claim 20 wherein the pre-treatment of the catalyst is carried out in the absence of an inert gas.

23. The process as claimed in claim 20 wherein the hydrocarbon is contacted with the catalyst in the absence of steam and/or carbon dioxide.

24. The process as claimed in claim 20 wherein the hydrocarbon feed is contacted with the catalyst in the presence of steam and/or carbon dioxide.

25. The process as claimed in claim 20 wherein the oxygen to carbon from hydrocarbon(s) mole ratio in the gaseous feed is in the range of from 0.01 to 0.6.

26. The process as claimed in claim 24 wherein the steam to oxygen mole ratio in the gaseous feed is in the range of from 0.0 to 10.0.

27. The process as claimed in claim 24 wherein the carbon dioxide to oxygen mole ratio in the gaseous feed is in the range from 0.0 to 5.0.

28. The process as claimed in claim 20 wherein the gaseous feed has a space velocity in the range of from 5 $dm^3/g_{catalyst}/h$ to 1000 $dm^3/g_{catalyst}/h$.

29. The process as claimed in claim 20 wherein the contacting is carried out at a temperature in the range from 600° C. to 1200° C.; and pressure of at least 1 atm.

30. The process as claimed in claim 20 wherein the oxygen to carbon mole ratio in the feed is between 0.4 to 0.6.

31. The process as claimed in claim 24 wherein the steam to oxygen mole ratio in the feed is between 0.0 and 2.0.

32. The process as claimed in claim 24 wherein the carbon dioxide to oxygen mole ratio in the feed is between 0.0 and 1.0.

33. The process as claimed in claim 28 wherein the space velocity of the gaseous feed is between 10 $dm^3/g_{catalyst}/h$ to 500 $dm^3/g_{catalyst}/h$.

34. The process as claimed in claim 29 wherein the reaction temperature is between 700° C. and 1000° C.

35. The process as claimed in claim 20 wherein the continuous gas-solid catalyst contactor is fixed catalyst bed reactor.

* * * * *